United States Patent

Yamamoto et al.

[11] Patent Number: 6,023,650
[45] Date of Patent: Feb. 8, 2000

[54] DRIVEN WHEEL SLIP CONTROLLING SYSTEM FOR VEHICLE

[75] Inventors: Osamu Yamamoto; Shuji Shiraishi, both of Wako; Osamu Yano, Haga-gun, all of Japan

[73] Assignee: Honda Giken Kogyo Kabushiki Kaisha, Tokyo, Japan

[21] Appl. No.: 08/637,154

[22] Filed: Apr. 24, 1996

[30] Foreign Application Priority Data

Jun. 16, 1995 [JP] Japan ..................... 7-149999

[51] Int. Cl.$^7$ ..................................... B60K 28/16
[52] U.S. Cl. .................. 701/82; 701/84; 180/197
[58] Field of Search .................. 701/82, 84, 87; 180/197

[56] References Cited

U.S. PATENT DOCUMENTS 5,415,600  5/1995  Mochizuki et al. ............ 477/110

FOREIGN PATENT DOCUMENTS

3818980 A1  12/1988  Germany.
3844121 A1   7/1989  Germany.

OTHER PUBLICATIONS

European Search Report, Application No. EP 96106459, Mar. 27, 1998.

*Primary Examiner*—William A. Cuchlinski, Jr.
*Assistant Examiner*—Arthur D. Donnelly
*Attorney, Agent, or Firm*—Armstrong, Westerman, Hattori, McLeland & Naughton

[57] ABSTRACT

A traction control system for a vehicle, which, during normal driving of the vehicle, if a driven wheel speed becomes less than a deceleration-control starting reference value which is set lower than a vehicle speed, a feed-back control of an opening degree of a throttle valve is started so as to converge the driven wheel speed into a target driven wheel speed. If a downshifting is conducted, the feed-back control of the throttle valve opening degree is feed-back controlled by using, in place of the driven wheel speed, a pseudo driven wheel speed calculated based on the number of revolutions of an engine and a gear position. With this arrangement, it is possible to open the throttle valve at an earlier stage to increase a driven wheel torque, and to avoid a deceleration slip at the time of downshifting at a high speed.

9 Claims, 6 Drawing Sheets

DRIVEN WHEEL SLIP CONTROLLING SYSTEM FOR VEHICLE

BACKGROUND OF THE INVENTION

1. Field of the Invention

The present invention relates to a driven wheel slip controlling system for a vehicle for controlling to increase or decrease a driven wheel torque in order to prevent an excessive slip of a driven wheel.

2. Description of the Related Art

In order to prevent the driven wheel from excessively slipping at the time of sudden start or sudden acceleration of the vehicle, there is a conventional technique, known as a traction control system, for decreasing an engine output to decrease the driven wheel torque to avoid the slipping of the driven wheel when a slip rate of the driven wheel exceeds a predetermined threshold value.

Further, when a driver of the vehicle downshifts, the driven wheel tends to lock-up because of engine braking. For this reason, the driven wheel may slip (a deceleration slip, i.e., skid) with respect to a road surface causing loss of control of the vehicle. In order to prevent such slippage, there is also a known technique to avoid the deceleration slip by controlling a throttle valve to open to increase the driven wheel torque when a locking of the driven wheel due to the downshifting is detected.

However, in the latter technique, the throttle valve is opened after detection of the locking of the driven wheel due to the downshifting. Therefore, there is a problem that the deceleration slip cannot swiftly be dissipated due to a delay of the control of the throttle valve, resulting in loss of control of the vehicle.

Furthermore, when the driver conducts either an upshifting or a kickdown, the driven wheel torque may temporarily be increased and the driven wheel may develop an acceleration slip. In such a case, the acceleration slip cannot swiftly be dissipated due to delay of the control of the throttle valve resulting in the likelihood of loss of control of the vehicle.

SUMMARY OF THE INVENTION

The present invention has been accomplished in view of the above circumstances, and it is an object of the present invention to effectively avoid a slip (including deceleration slip and acceleration slip) of the driven wheel at the time of speed-shifting of the vehicle.

According to a first aspect of the present invention, there is provided a driven wheel slip controlling system for a vehicle, comprising: driven wheel speed calculating means for calculating a driven wheel speed; vehicle speed calculating means for calculating a vehicle speed; reference value calculating means for calculating a reference value for determining a slip state of a driven wheel based on a vehicle speed; slip-state discerning means for discerning the slip state of the driven wheel based on the driven wheel speed and the reference value; and driven wheel torque control means for controlling a driven wheel torque when the slip-state discerning means discerns that the driven wheel is in a predetermined slip state.

The system further comprises: gear position detecting means for detecting a gear position of a transmission; speed-shifting discerning means for discerning a speed-shifting of the transmission based on the gear position; engine revolutions number detecting means for detecting the number of revolutions of an engine; pseudo driven wheel speed calculating means for calculating a pseudo driven wheel speed based on the gear position and the number of revolutions of the engine, and wherein when the speed-shifting discerning means discerns a speed-shifting of the transmission, the slip-state discerning means discerns the slip state of the driven wheel based on the reference value and the pseudo driven wheel speed in place of the driven wheel speed.

With the first aspect, when the speed-shifting discerning means discerns the speed-shifting of the transmission, the slip-state discerning means determines whether or not the driven wheel is in the predetermined slipping state based on the pseudo driven wheel speed in place of the driven wheel speed. If it is determined that the driven wheel is in the predetermined slipping state, the driven wheel torque control means controls the driven wheel torque. Therefore, it is possible to make the affected or apparent driven wheel slip ratio greater as compared with a case in which the slipping state of the driven wheel is determined based on the driven wheel speed, and to swiftly increase or decrease the driven wheel torque to effectively avoid the slipping of the driven wheel.

According to a second aspect of the present invention, in addition to the first aspect, the pseudo driven wheel speed calculating means calculates the pseudo driven wheel speed until a first predetermined time period elapses after the speed-shifting discerning means discerns a downshifting.

According to a third aspect of the present invention, in addition to the second aspect, the first predetermined time period is equal to a time period beginning when the speed-shifting discerning means discerns the downshifting and ending when the downshifting is completed.

According to a fourth aspect of the present invention, in addition to the second feature, the first predetermined time period is equal to a time period beginning when the speed-shifting discerning means discerns the downshifting and ending when the driven wheel speed becomes equal to a predetermined target speed.

With the second to fourth aspects, the pseudo driven wheel speed calculating means calculates the pseudo driven wheel speed until the first predetermined time period (i.e., a time period beginning when the speed-shifting discerning means discerns the downshifting and ending when the downshifting is completed, or a time period beginning when the speed-shifting discerning means discerns the downshifting and ending when the driven wheel speed becomes equal to the predetermined target speed) elapses after the speed-shifting discerning means discerns the downshifting. Therefore, it is possible to swiftly increase the driven wheel torque when the deceleration slip tends to be generated after the downshifting.

According to a fifth aspect of the present invention, in addition to the second aspect, the slip-state discerning means discerns the slip state of the driven wheel based on the reference value and the pseudo driven wheel speed in place of the driven wheel speed if the following three conditions are satisfied: 1) the gear position is fixed until a second predetermined time period which is less than the first predetermined time period elapses after the speed-shifting discerning means discerns the downshifting; 2) the pseudo driven wheel speed is less than the driven wheel speed; and 3) the driven wheel speed is less than a reference value in which an acceleration slipping control is started.

With the fifth aspect, the control for increasing the driven wheel torque based on the pseudo driven wheel speed is not started until the following three points are confirmed: 1) The gear position is fixed until a predetermined time period elapses after the speed-shifting discerning means discerns the downshifting, and the downshifting has been actually conducted; 2) The pseudo driven wheel speed is less than the driven wheel speed, and if the pseudo driven wheel speed is employed, the driven wheel torque can swiftly be increased; and 3) The driven wheel speed is less than a reference value at which an acceleration slip control is started, and there is no possibility that the driven wheel torque is excessively increased.

According to a sixth aspect of the present invention, in addition to the fifth aspect, the first predetermined time period is set longer as a lateral acceleration of the vehicle is greater.

During sharp turning of the vehicle in which a lateral acceleration of the vehicle is large, inner wheels during the turning float up and it is difficult to recover from the decelerating slip. But with the sixth aspect, because the first predetermined time period is elongated, the control based on the pseudo driven wheel speed is continued, and it is possible to reliably recover from the deceleration slip.

According to a seventh aspect of the present invention, in addition to the fifth aspect, the second predetermined time period is set shorter as a lateral acceleration of the vehicle is smaller and the gear position after the downshifting is in a lower stage.

When the frictional coefficient of the road surface is small and engine braking is easily effected, the vehicle is prone to get into the deceleration slip. But with the seventh aspect, because the second predetermined time is shortened, the driven wheel torque increases earlier, which reduces the possibility that the vehicle goes into the deceleration slip.

According to an eighth aspect of the present invention, there is provided a driven wheel slip controlling system for a vehicle, comprising: driven wheel speed calculating means for calculating a driven wheel speed; vehicle speed calculating means for calculating a vehicle speed; reference value calculating means for calculating a reference value for determining a slip state of a driven wheel based on the vehicle speed; slip-state discerning means for discerning the slip state of the driven wheel based on the driven wheel speed and the reference value; and driven wheel torque control means for controlling to increase a driven wheel torque when the slip-state discerning means discerns that the driven wheel is in a predetermined slip state, wherein the system further comprises: gear position detecting means for detecting a gear position of a transmission; downshifting discerning means for discerning a downshifting of the transmission based on the gear position; engine revolutions number detecting means for detecting the number of revolutions of an engine; pseudo driven wheel speed calculating means for calculating a pseudo driven wheel speed based on the gear position and the number of revolutions of the engine, and wherein the slip-state discerning means discerns a slip state of the driven wheel based on the reference value and the pseudo driven wheel speed in place of the driven wheel speed, for a predetermined time period elapsing after the downshifting discerning means discerns the downshifting.

With the eighth aspect, when the downshifting discerning means discerns the downshifting of the transmission, the slip-state discerning means determines whether or not the driven wheel is in the predetermined slipping state based on the pseudo driven wheel speed in place of the driven wheel speed. If it is determined that the driven wheel is in the predetermined slipping state, the driven wheel torque control means controls the driven wheel torque to increase. Therefore, as compared with a case in which a slipping state of the driven wheel is determined based on the driven wheel speed, it is possible to increase the apparent driven wheel slip rate to swiftly increase the driven wheel torque, and to effectively avoid the deceleration slip of the driven wheel.

According to a ninth aspect of the present invention, there is provided a driven wheel slip controlling system for a vehicle, comprising: driven wheel speed calculating means for calculating a driven wheel speed; vehicle speed calculating means for calculating a vehicle speed; reference value calculating means for calculating a reference value for determining a slip state of a driven wheel based on the vehicle speed; slip-state discerning means for discerning the slip state of the driven wheel based on the driven wheel speed and the reference value; and driven wheel torque control means for controlling to increase a driven wheel torque when the slip-state discerning means discerns that the driven wheel is in a predetermined slip state, wherein the system further comprises: gear position detecting means for detecting a gear position of a transmission; upshifting/kickdown discerning means for discerning an upshifting or kickdown of the transmission based on the gear position; engine revolutions number detecting means for detecting the number of revolutions of an engine; pseudo driven wheel speed calculating means for calculating a pseudo driven wheel speed based on the gear position and the number of revolutions of the engine, and wherein the slip-state discerning means discerns a slip state of the driven wheel based on the reference value and the pseudo driven wheel speed in place of the driven wheel speed, for a predetermined time period elapsing after the upshifting/kickdown discerning means discerns the upshifting or kickdown.

With the ninth aspect, when the upshifting/kickdown discerning means discerns the upshifting or kickdown of the transmission, the slip-state discerning means determines whether or not the driven wheel is in the predetermined slipping state based on the pseudo driven wheel speed in place of the driven wheel speed. If it is determined that the driven wheel is in the predetermined slipping state, the driven wheel torque control means controls the driven wheel to decrease. Therefore, as compared with a case in which a slipping state of the driven wheel is discerned based on the driven wheel speed, it is possible to increase the apparent driven wheel slip rate to swiftly decrease the driven wheel torque, and to effectively avoid the acceleration slip of the driven wheel.

BRIEF DESCRIPTION OF THE DRAWINGS

FIGS. 1 to 6 show an embodiment of the present invention, wherein:

FIG. 1 is a diagrammatic illustration of a vehicle including a driven wheel slip controlling device;

FIG. 2 is a block diagram of a control system;

FIG. 3 is a block diagram showing a circuit arrangement of an electronic control unit;

FIG. 4 is a flowchart for explaining the operation of the present invention;

FIG. 5 is a graph explaining the operation at the time of a deceleration slip control; and FIG. 6 is a graph for explaining the operation at the time of an acceleration slip control.

DETAILED DESCRIPTION OF THE PREFERRED EMBODIMENT

The present invention will now be described by way of a preferred embodiment with reference to the accompanying drawings.

Figure 1:
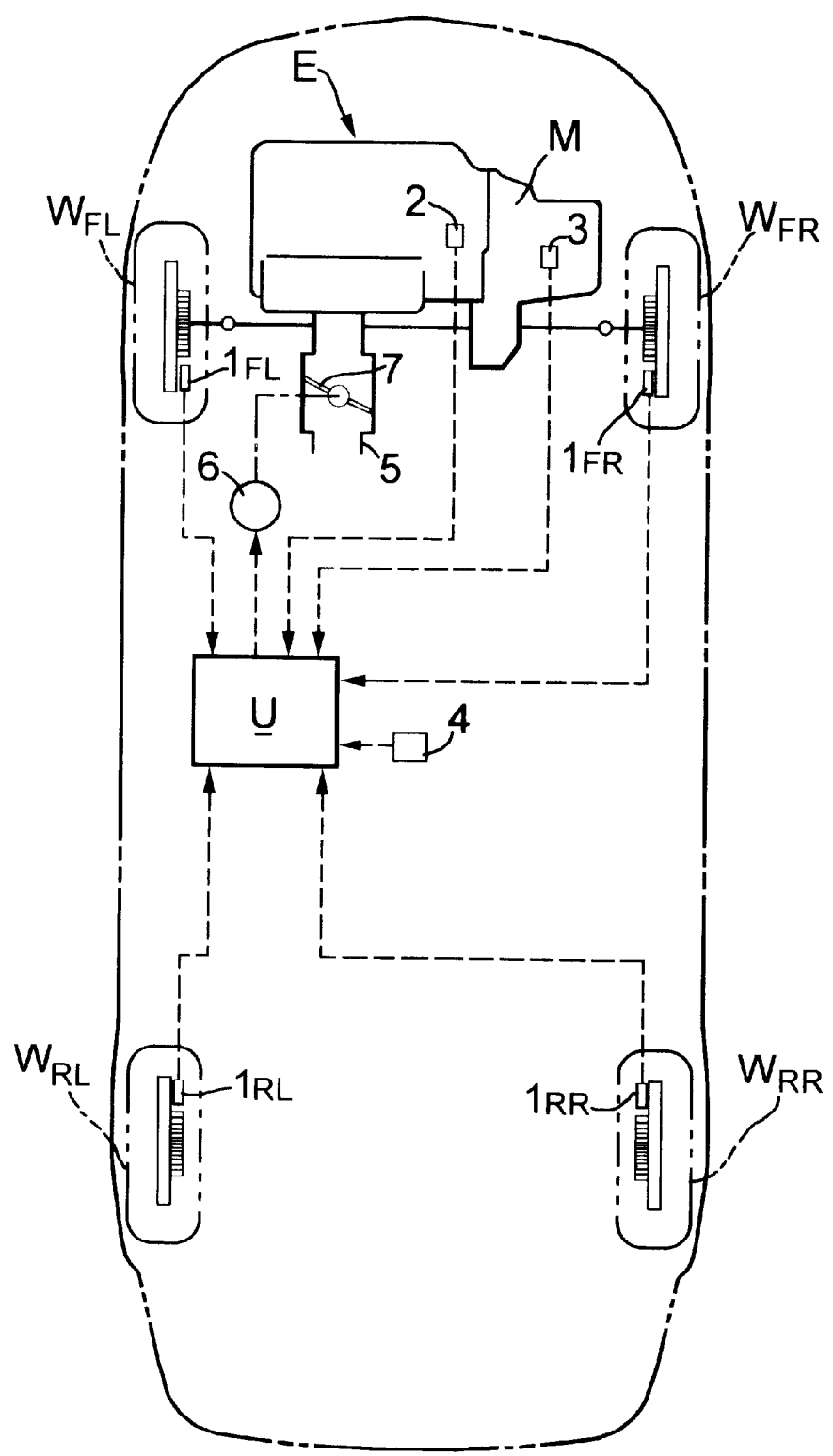

FIG. 1 shows a front wheel drive vehicle, which includes a pair of left and right driven wheels $W_{FL}$ and $W_{FR}$ driven by an engine E, and a pair of left and right follower wheels $W_{RL}$ and $W_{RR}$. Driven wheel speed detecting means $1_{FL}$ and $1_{FR}$ are mounted on the driven wheels $W_{FL}$ and $W_{FR}$, respectively, and follower wheel speed detecting means $1_{RL}$ and $1_{RR}$ are mounted on the follower wheels $W_{RL}$ and $W_{RR}$, respectively.

The engine E is provided with an engine revolutions detecting means 2 for detecting a number Ne of revolutions of the engine. A transmission M is provided with a gear position detecting means 3 for detecting a gear position GP. A lateral acceleration detecting means 4 is provided for detecting a lateral acceleration LG in place in the vehicle. The engine E includes an intake passage 5 which is provided with a throttle valve 7 connected to a pulse motor 6 for opening and closing.

The driven wheel speed detecting means $1_{FL}$ and $1_{FR}$, the follower wheel speed detecting means $1_{RL}$ and $1_{RR}$, the engine revolutions number detecting means 2, the gear position detecting means 3, the lateral acceleration detecting means 4 and the pulse motor 6 are all connected to an electronic control unit U including a microcomputer.

Figure 2:
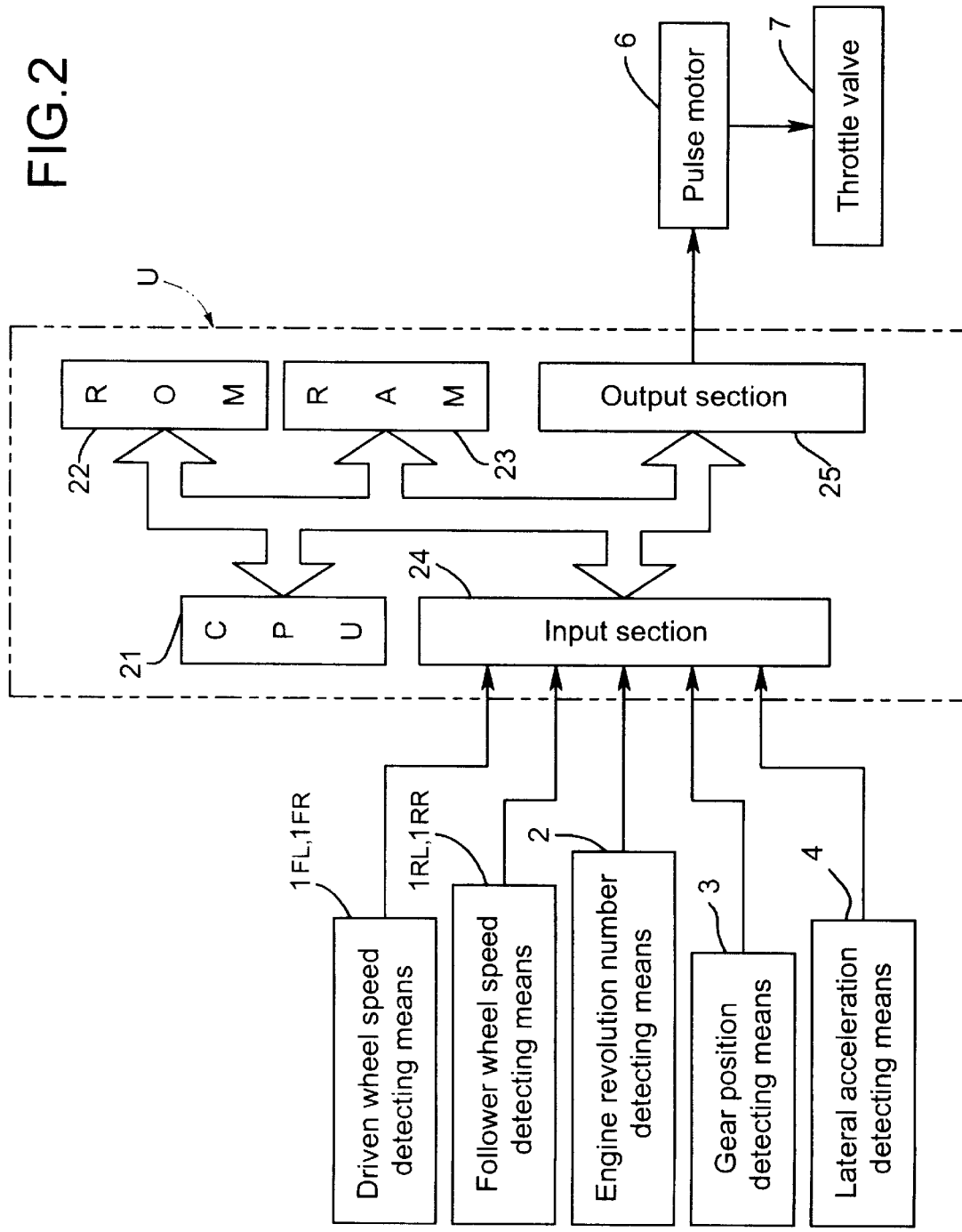

FIG. 2 shows the electronic control unit U. The electronic control unit U controls an output from the engine E by arithmetically processing signals from the various detecting means based on a control program and driving the throttle valve 7 by the pulse motor 6, so that when an excessive slip of the driven wheels $W_{FL}$ and $W_{FR}$ is detected, such excessive slip is inhibited. The electronic control unit U includes a central processing unit (CPU) 21 for conducting the arithmetic processing, a read only memory (ROM) 22 in which the control program and data such as various maps are stored, a random access memory (RAM) 23 for temporarily storing the signals from the various detecting means and arithmetic results, an input section 24 to which the various detecting means (i.e., the driven wheel speed detecting means $1_{FL}$ and $1_{FR}$, the follower wheel speed detecting means $I_{RL}$ and $I_{RR}$, the engine revolutions number detecting means 2, the gear position detecting means 3, the lateral acceleration detecting means 4) are connected, and an output section 25 to which the pulse motor 6 is connected. Thus, the electronic control unit U arithmetically processes the various signals received through the input section 24, the data stored in the read only memory 22 and the like, by the central processing unit 21 based on the control program which will be described hereinafter, and finally drives the pulse motor 6 through the output section 25. This causes the throttle valve 7 to be controlled to change the output from the engine E, thereby inhibiting the excessive slip of the driven wheels $W_{FL}$ and $W_{FR}$.

If the driven wheel speed coincides with a vehicle speed, the driven wheels $W_{FL}$, $W_{FR}$ do not slip with respect to a road surface. But when the driven wheel speed exceeds the vehicle speed at the time of rapid acceleration or rapid starting, the driven wheels $W_{FL}$, $W_{FR}$ slip with respect to the road surface (this is called an acceleration slip). On the other hand, when a strong engine brake is applied due to a downshifting or the like at a high speed, the driven wheel speed becomes lower than the vehicle speed to bring the driven wheel $W_{FL}$ and $W_{FR}$ into locking tendency, and the driven wheel $W_{FL}$ and $W_{FR}$ likewise slip with respect to the road surface (this is called a deceleration slip). That is, a slip which is called in a broad sense can be divided into the acceleration slip generated between the driven wheels $W_{FL}$, $W_{FR}$ and the road surface when the driven wheel speed becomes larger than the vehicle speed, and the deceleration slip generated between the driven wheels $W_{FL}$, $W_{FR}$ and the road surface when the driven wheel speed becomes smaller than the vehicle speed.

Figure 3:
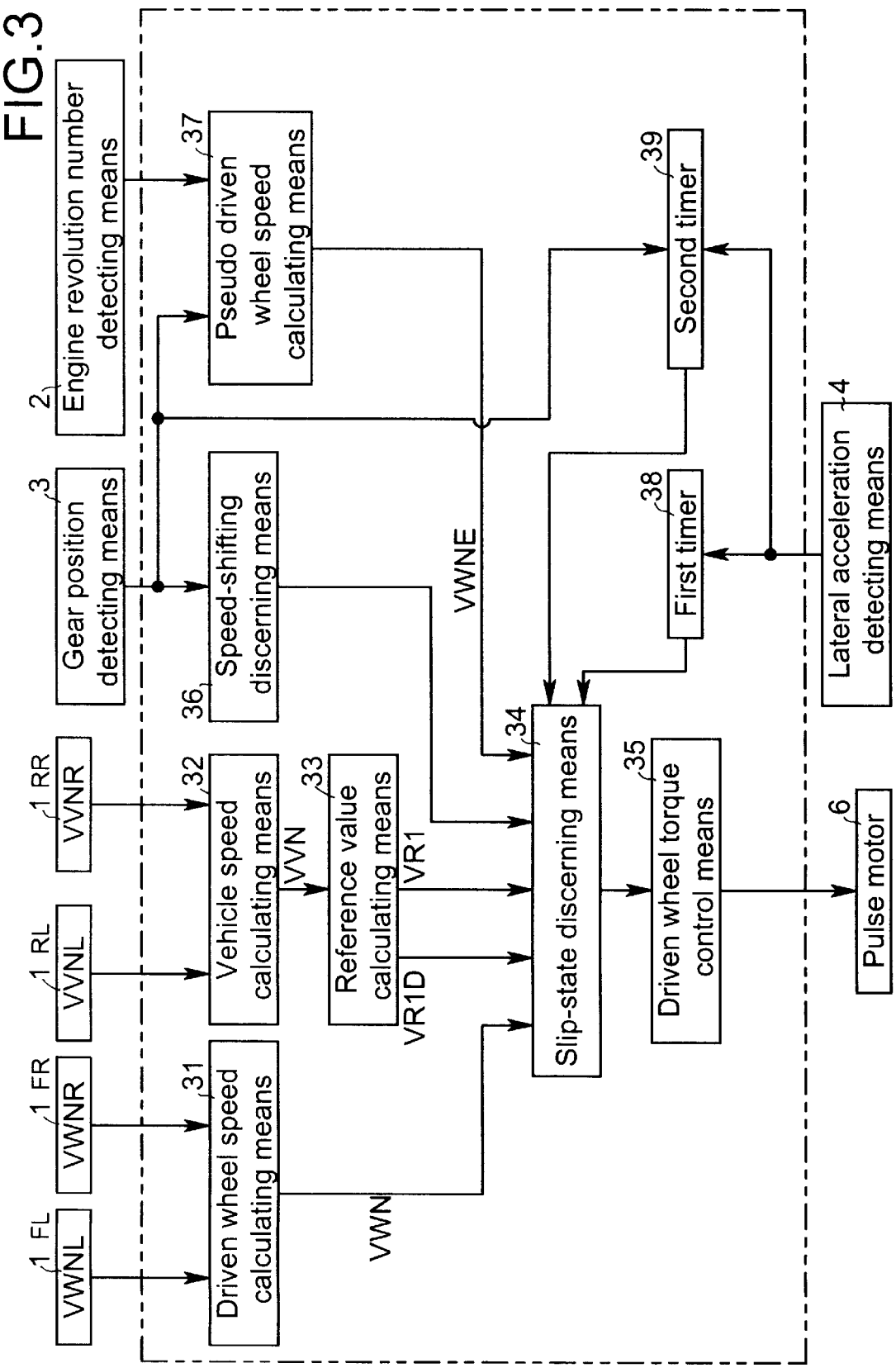

The outline of a traction control system will be described below with reference to FIG. 3.

Output signals VWNL and VWNR from the left and right driven wheel speed detecting means $1_{FL}$ and $1_{fr}$, respectively, are input to the driven wheel speed calculating means 31, where the driven wheel speed VWN is calculated as the average value of the output signals VWNL and VWNR from the left and right driven wheel speed detecting means $1_{FL}$ and $1_{FR}$. Output signals VVNL and VVNR from the left and right follower wheel speed detecting means $1_{RL}$ and $1_{RR}$, respectively, are input to the vehicle speed calculating means 32, where the vehicle speed VVN is calculated as the average value of the output signals VVNL and VVNR from the left and right follower wheel speed detecting means $1_{RL}$ and $I_{RR}$.

Figure 5:
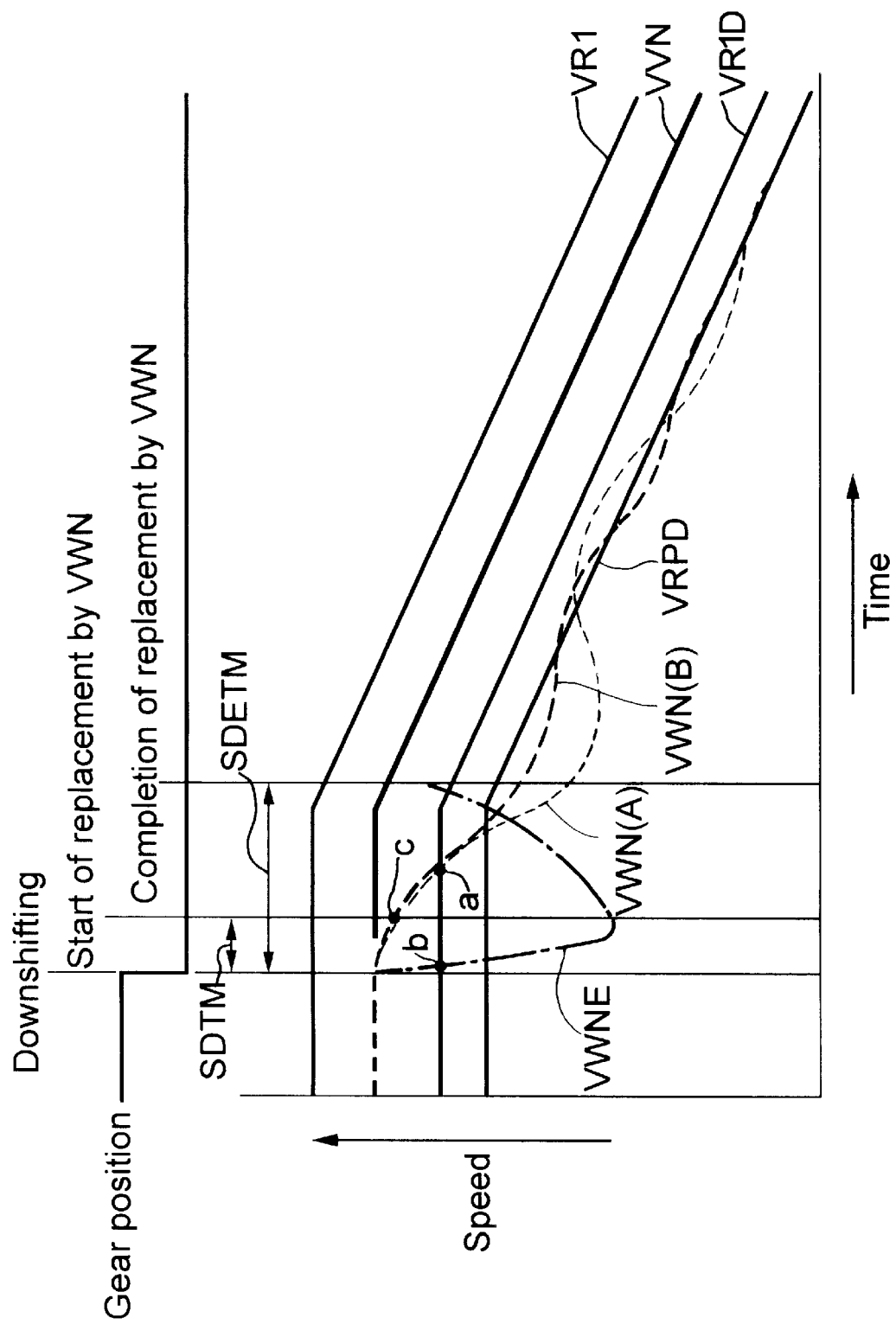

The vehicle speed VVN is input to the reference value calculating means 33, where various reference values for conducting a slip control of the driven wheels $W_{FL}$ and $W_{FR}$ are calculated. More specifically, for the deceleration slip control in which the vehicle speed VVN is decreased as shown in FIG. 5, the following three values are calculated: 1) a deceleration-control starting reference value VR1D (VVN>VR1D) in which a control for increasing the driven wheel torque is started when the driven wheel speed VWN becomes lower than the deceleration-control starting reference value VR1D; 2) an acceleration-control starting reference value VR1 (VVN<VR1) in which a control for decreasing the driven wheel torque is started when the driven wheel speed VWN becomes larger than the acceleration-control starting reference value VR1; and 3) a target driven wheel speed VRPD which is a target value for converging the driven wheel speed VWN. The target driven wheel speed VRPD is a target value of the driven wheel speed VWN at the time of the deceleration (i.e., at the time of the deceleration slip of the driven wheels $W_{FL}$ and $W_{FR}$) in which the vehicle speed VVN is decreased. The target driven wheel speed VRPD is set such that the relationship of VRPD<VR1D<VVN is established so as to apply the maximum grip force to the driven wheels $W_{FL}$ and $W_{FR}$.

Figure 6:
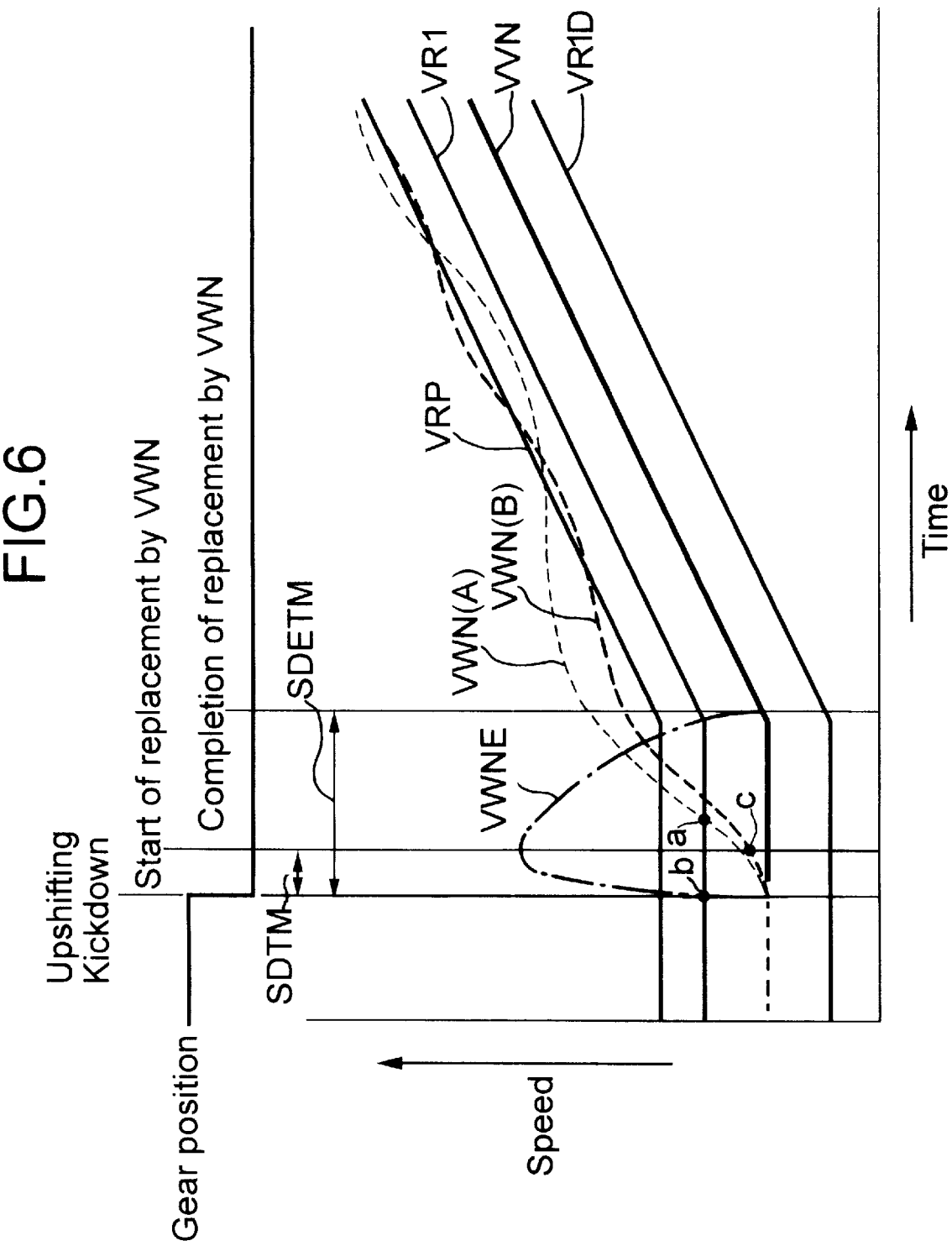

As shown in FIG. 6, for the acceleration slip control in which the vehicle speed VVN is increased, the following three values are calculated: 1) a deceleration-control starting reference value VR1 (VVN>VR1) in which a control for decreasing the driven wheel torque is started when the driven wheel speed VWN becomes larger than the deceleration-control starting reference value VR1; 2) an acceleration-control starting reference value VR1D (VVN>VR1D) in which a control for increasing the driven wheel torque is started when the driven wheel speed VWN becomes lower than the acceleration-control starting reference value VR1D; and 3) a target driven wheel speed VRP which is a target value for converging the driven wheel speed VWN. The target driven wheel speed VRP is a target value of the driven wheel speed VWN at the time of the acceleration (i.e., at the time of the acceleration slip of the driven wheels $W_{FL}$ and $W_{FR}$) in which the vehicle speed VVN is increased. The target driven wheel speed VRP is set such that the relationship of VVN<VR1<VRP is established so as to apply the maximum grip force to the driven wheels $W_{FL}$ and $W_{FR}$.

The driven wheel speed VWN calculated by the driven wheel speed calculating means 31, the deceleration-control starting reference value VR1D and the acceleration-control starting reference value VR1 calculated by the reference value calculating means 33 are input to the slip-state discerning means 34, where the driven wheel speed VWN is compared with the deceleration-control starting reference value VR1D and the acceleration-control starting reference value VR1. If the driven wheel speed VWN becomes less than the deceleration-control starting reference value VR1D, the driven wheel torque control means 35 controls the throttle valve 7 for opening through the pulse motor 6 so as to converge the driven wheel speed VWN toward the target driven wheel speed VRPD by a PID feed-back control. If the driven wheel speed VWN exceeds the acceleration-control starting reference value VR1, the driven wheel torque control means 35 controls the throttle valve 7 for closing through the pulse motor 6 so as to converge the driven wheel speed VWN toward the target driven wheel speed VRP by the PID feed-back control.

The speed-shifting discerning means 36 discerns speed-shifting (downshifting, upshifting and kickdown) of the transmission M based on the gear position GP detected by the gear position detecting means 3 and outputs this result to slip-state discerning means 34.

The pseudo driven wheel speed calculating means 37 calculates the pseudo driven wheel speed VWNE by using the following equation (1) based on the number Ne of revolutions of the engine detected by the engine revolutions number detecting means 2 and the gear ratio GR of the gear position GP detected by the gear position detecting means 3:

$$VWNE = NE \times GR \times KSD \quad (1)$$

In the equation (1), KSD is a wheel speed converting coefficient which is determined based on a characteristic of a power transmission system between the engine E and the driven wheels $W_{FL}$, $W_{FR}$.

When the speed-shifting discerning means 36 discerns the speed-shifting of the transmission M, first and second timers 38 and 39 are set. The second timer 39 counts a time period from when a speed-shifting command is output to when the speed-shifting is actually started. The first timer 38 counts a time period from when the speed-shifting command is output to when the speed-shifting is actually completed.

The count time to be counted by the first timer 38 is set longer as the lateral acceleration LG is larger. The count time to be counted by the second timer 39 is set shorter as the lateral acceleration LG is smaller and the gear position GP after downshifting is at a lower stage. The count times of the first and second timers 38 and 39 are calculated by map-searching, for example.

When the speed-shifting of the transmission M is conducted, the driven wheel speed VWN is replaced by the pseudo driven wheel speed VWNE calculated by the pseudo driven wheel speed calculating means 37 based on outputs from the first and second timers 38 and 39, and a slip control of the driven wheels $W_{FL}$, $W_{FR}$ is conducted based on the pseudo driven wheel speed VWNE.

Figure 4:
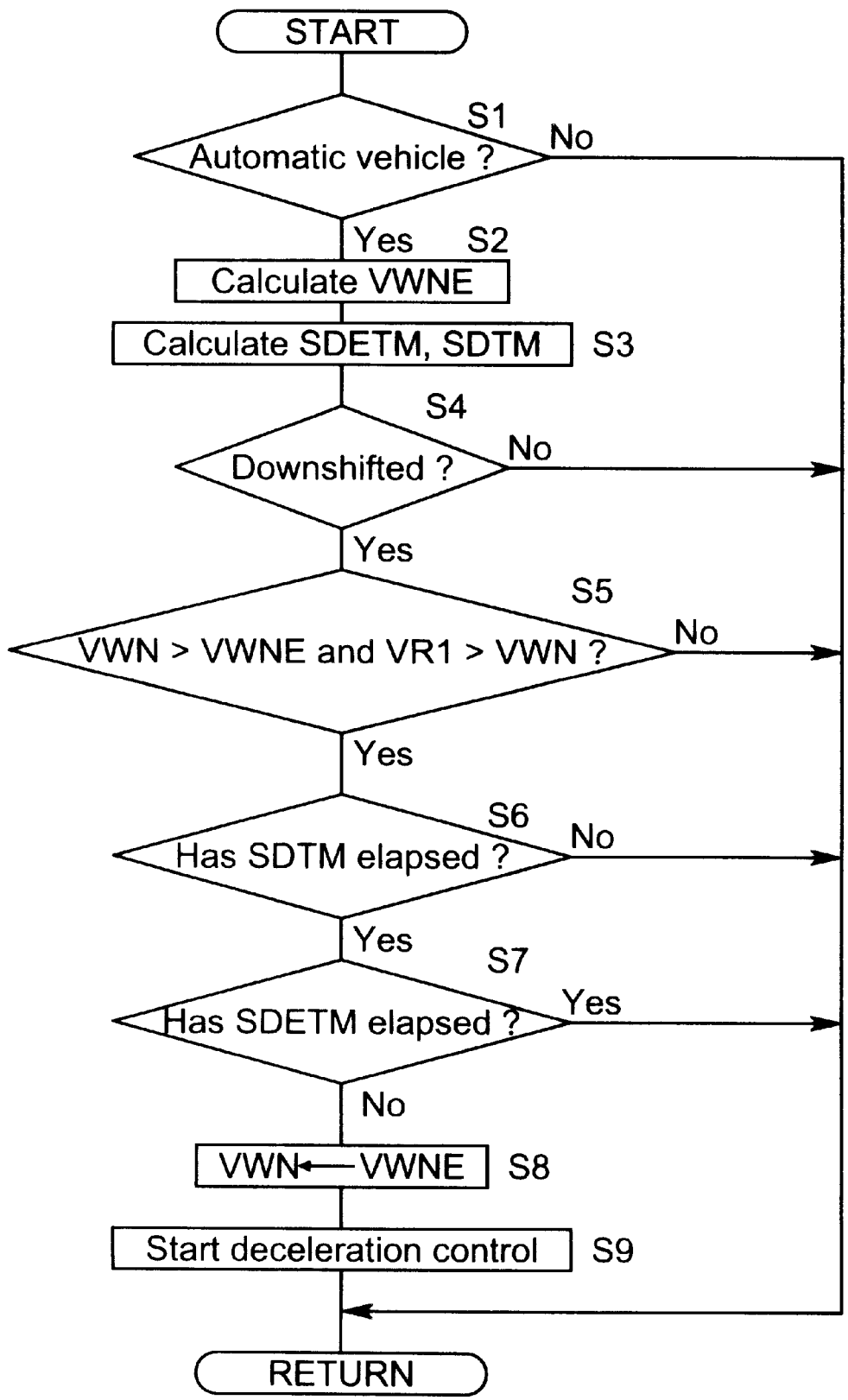

Next, the control at the time of downshifting of the transmission will be explained based on a flowchart of FIG. 4 and a graph of FIG. 5.

First, it is determined at step SI whether or not the vehicle is provided with an automatic transmission. Only if YES at step S1, a processing is advanced to step S2. At step S2, the pseudo driven wheel speed VWNE is calculated based on the equation (1), and the count times of the first and second timers 38 and 39 are calculated at step S3.

At step S4, if the speed-shifting discerning means 36 discerns the downshifting and the shifting command is output for downshifting the transmission M, the first and second timers 38 and 39 are set to start counting. At subsequent step S5, if the driven wheel speed VWN is greater than the pseudo driven wheel speed VWNE, and the acceleration-control starting reference value VR1 is greater than the pseudo driven wheel speed VWNE, the following speed-reducing control is conducted.

That is, when the time is counted up by the second timer 39 at step S6 and the downshifting of the transmission M is actually started, the driven wheel speed VWN is replaced by the pseudo driven wheel speed VWNE at step S8. This replacement is kept until the time is counted up by the first timer 38 at step S7 and the downshifting of the transmission M is actually completed. Therefore, during a time period from when the downshifting is actually started to when such downshifting is completed, the slip-state discerning means 34 discerns the slip-state of the driven wheels $W_{FL}$, $W_{FR}$ based on the pseudo driven wheel speed VWNE instead of the driven wheel speed VWN.

Whenever another downshifting is conducted during counting of the second timer 39, the second timer 39 is reset.

In FIG. 5, a line VWN (A) indicates a conventional control using the driven wheel speed VWN. In this case, when the driven wheel speed VWN is reduced to be less than the deceleration-control starting reference value VR1D by engine braking due to a downshifting (point a), the throttle valve 7 is controlled to open so as to increase the driven wheel speed VWN to converge toward the target driven wheel speed VRPD. However, a large reduction of the driven wheel speed VWN cannot be avoided due to a delay of the control and thus, there is a problem that the driven wheels $W_{FL}$ and $W_{FR}$ may get into an excessive deceleration slip.

A line VWN (B) in FIG. 5 shows the present invention. According to the invention, in contrast, the pseudo driven wheel speed VWNE is swiftly reduced lower than the deceleration-control starting reference value VR1D at point b. Therefore, when the time is counted up by the second timer 39, the opening control of the throttle valve 7 is started at point c simultaneously. Moreover, because a deviation between the target driven wheel speed VRPD and the pseudo driven wheel speed VWNE is larger than that between the target driven wheel speed VRPD and the pseudo driven wheel speed VWNE, the throttle valve 7 is swiftly controlled for opening. Therefore, the driven wheel speed VWN is converged toward the target driven wheel speed VRPD without largely dropping, and the driven wheels $W_{FL}$, $W_{FR}$ are prevented to from getting into an excessive deceleration slip.

Since the deceleration slip control is conducted at step S5 based on a condition that the driven wheel speed VWN is greater than the pseudo driven wheel speed VWNE, the pseudo driven wheel speed VWNE necessarily becomes less than the deceleration-control starting reference value VR1D earlier than the driven wheel speed VWN, and it is possible to start the deceleration slip control early. Further, since the deceleration slip control is conducted at step S5 based on a condition that the acceleration-control starting reference value VR1 is larger than the driven wheel speed VWN, it is possible to discern the acceleration slip control and the deceleration slip control so as to reliably conduct the deceleration slip control.

The count time SDETM to be counted by the first timer 38 is set longer as the lateral acceleration LG detected by the lateral acceleration detecting means 4 is larger. Therefore, during a high speed turning of the vehicle in which the lateral acceleration LG is large, even if the driven wheels $W_{FL}$ and $W_{FR}$ which are inner wheels during turning are floated up from the road surface and it is difficult to recover from the deceleration slip, it is possible to continue the above-described deceleration slip control for a long time to prevent the excessive declaration slip from being generated.

Further, the counted time SDTM to be counted by the second timer 39 is set shorter as the lateral acceleration LG (i.e., a frictional coefficient of a road surface) is smaller and there is a greater possibility that the deceleration slip is produced because the gear position GP after the downshifting is at lower stage and the engine brake is easily effected. Therefore, it is possible to swiftly start the above-described deceleration slip control to prevent the excessive deceleration from being generated.

Now, when the upshifting or kickdown is conducted, the driven wheel torque temporarily increases and the driven wheels $W_{FL}$, $W_{FR}$ are prone to get into the acceleration slip. The control for avoiding the acceleration slip will be described with reference to a graph in FIG. 6.

In the case of the conventional control using the driven wheel speed VWN, as shown by a line VWN (A), when the driven wheel speed VWN increases and exceeds the acceleration-control starting reference value VR1 due to an increase of the driven wheel torque by upshifting or kickdown (point a), the throttle valve 7 is controlled for closing in order to decrease the driven wheel speed VWN for converging into the target driven wheel speed VRP. However, a large increase of the driven wheel speed VWN cannot be avoided due to a delay of the control, and there is a problem that the driven wheels $W_{FL}$ and $W_{FR}$ may get into the excessive acceleration slip.

On the other hand, according to the present invention, as shown by a line VWN (B) in FIG. 6, the pseudo driven wheel speed VWNE swiftly exceeds the acceleration-control starting reference value VR1 at point b, and when the time is counted up by the second timer 39, the control for closing the throttle valve 7 is started at point c concurrently. Further, because a deviation between the target driven wheel speed VRP and the pseudo driven wheel speed VWNE is greater than that between the target driven wheel speed VRP and the driven wheel speed VWN, the throttle valve 7 is swiftly controlled for closing. With this arrangement, the driven wheel speed VWN is not largely increased and is converged into the target driven wheel speed VRP, and the driven wheels $V_{FL}$ and $W_{FR}$ are prevented from getting into the excessive acceleration slip.

Although the embodiments of the present invention have been described in detail, it will be understood that the present invention is not limited to the above-described embodiments, and various modifications may be made without departing from the spirit and scope of the invention defined in claims.

For example, the front wheel drive vehicle whose rear wheels are follower wheels has been described in the embodiment, it is possible to apply the present invention to a rear wheel drive vehicle whose front wheels are follower wheels. Further, instead of maintaining the replacement of the driven wheel speed VWN by the pseudo driven wheel speed VWNE until the time is counted up by the first timer 38, such replacement may be maintained until the driven wheel speed VWN is converged into a predetermined speed (e.g., the target driven wheel speed VRP or VRPD).

What is claimed is:

1. A driven wheel slip controlling system for a vehicle, comprising:

driven wheel speed calculating means for calculating a driven wheel speed;

vehicle speed calculating means for calculating a vehicle speed;

reference value calculating means for calculating a reference value for determining a slip state of a driven wheel based on a vehicle speed;

slip-state discerning means for discerning the slip state of the driven wheel based on the driven wheel speed and the reference value;

driven wheel torque control means for controlling a driven wheel torque when said slip-state discerning means discerns that the driven wheel is in a predetermined slip state;

gear position detecting means for detecting a gear position of a transmission;

speed-shifting discerning means for discerning a speed-shifting of the transmission based on said gear position;

engine revolutions number detecting means for detecting the number of revolutions of an engine; and pseudo driven wheel speed calculating means for calculating a pseudo driven wheel speed based on the gear position and the number of revolutions of the engine, wherein when said speed-shifting discerning means discerns a speed-shifting of the transmission, said slip-state discerning means discerns the slip state of the driven wheel based on said reference value and said pseudo driven wheel speed in place of said driven wheel speed to prevent an excessive slip-state from initially occurring.

2. A driven wheel slip controlling system according to claim 1, wherein said pseudo driven wheel speed calculating means calculates said pseudo driven wheel speed until a first predetermined time period elapses after said speed-shifting discerning means discerns a downshifting.

3. A driven wheel slip controlling system according to claim 2, wherein said first predetermined time period is equal to a time period beginning when said speed-shifting discerning means discerns the downshifting and ending when the downshifting is completed.

4. A driven wheel slip controlling system according to claim 2, wherein said first predetermined time period is equal to a time period beginning when said speed-shifting discerning means discerns the downshifting and ending when the driven wheel speed becomes equal to a predetermined target speed.

5. A driven wheel slip controlling system according to claim 2, wherein said slip-state discerning means discerns the slip state of the driven wheel based on said reference value and said pseudo driven wheel speed in place of said driven wheel speed if the following three conditions are satisfied: 1) said gear position is fixed until a second predetermined time period which is less than said first predetermined time period elapses after said speed-shifting discerning means discerns the downshifting; 2) said pseudo driven wheel speed is less than said driven wheel speed; and 3) said driven wheel speed is lower than a reference value in which an acceleration slipping control is started.

6. A driven wheel slip controlling system according to claim 5, wherein said first predetermined time period is set longer as a lateral acceleration of the vehicle becomes greater.

7. A driven wheel slip controlling system according to claim 5, wherein said second predetermined time period is set shorter as a lateral acceleration of the vehicle becomes smaller and said gear position after the downshifting is in a lower stage.

8. A driven wheel slip controlling system for a vehicle, comprising:

driven wheel speed calculating means for calculating a driven wheel speed;

vehicle speed calculating means for calculating a vehicle speed;

reference value calculating means for calculating a reference value for determining a slip state of a driven wheel based on the vehicle speed;

slip-state discerning means for discerning the slip state of the driven wheel based on the driven wheel speed and the reference value;

driven wheel torque control means for controlling so as to increase a driven wheel torque when said slip-state discerning means discerns that the driven wheel is in a predetermined slip state;

gear position detecting means for detecting a gear position of a transmission;

downshifting discerning means for discerning a downshifting of the transmission based on said gear position;

engine revolutions number detecting means for detecting the number of revolutions of an engine; and pseudo drive wheel speed calculating means for calculating a pseudo driven wheel speed based on the gear position and the number of revolutions of the engine, wherein said slip-state discerning means discerns a slip state of said driven wheel based on said reference value and said pseudo driven wheel speed in place of said driven wheel speed, for a predetermined time period elapsing after said downshifting discerning means discerns the downshifting to prevent an excessive slip-state from initially occurring.

9. A driven wheel slip controlling system for a vehicle, comprising:

driven wheel speed calculating means for calculating a driven wheel speed;

vehicle speed calculating means for calculating a vehicle speed;

reference value calculating means for calculating a reference value for determining a slip state of a driven wheel based on the vehicle speed;

slip-state discerning means for discerning the slip state of the driven wheel based on the driven wheel speed and the reference value;

driven wheel torque control means for controlling to increase a driven wheel torque when said slip-state discerning means discerns that the driven wheel is in a predetermined slip state;

gear position detecting means for detecting a gear position of a transmission;

upshifting/kickdown discerning means for discerning an upshifting or kickdown of the transmission based on said gear position;

engine revolutions number detecting means for detecting the number of revolutions of an engine; and pseudo driven wheel speed calculating means for calculating a pseudo driven wheel speed based on the gear position and the number of revolutions of the engine, wherein said slip-state discerning means discerns a slip state of said driven wheel based on said reference value and said pseudo driven wheel speed in place of said driven wheel speed for a predetermined time period elapsing after said upshifting/kickdown discerning means discerns the upshifting or kickdown to prevent an excessive slip-state from initially occurring.

* * * * *